Oct. 26, 1937.　　　J. M. OLDHAM　　　2,096,822
SPRING STRUCTURE
Filed Jan. 25, 1936　　2 Sheets-Sheet 1
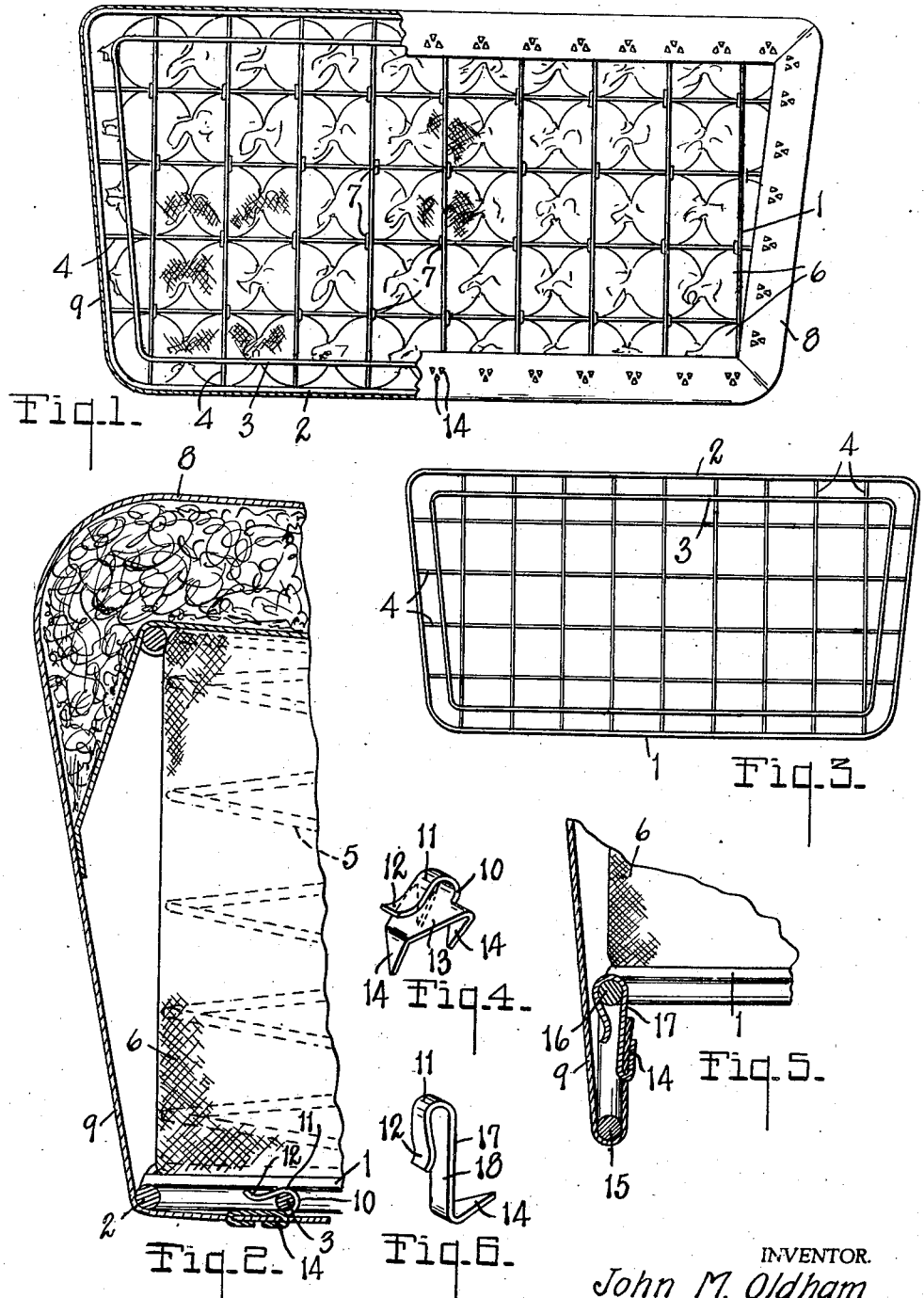
INVENTOR.
John M. Oldham
BY
Chappell, Earl & Chappell
ATTORNEYS Oct. 26, 1937.  J. M. OLDHAM  2,096,822
SPRING STRUCTURE.
Filed Jan. 25, 1936  2 Sheets-Sheet 2
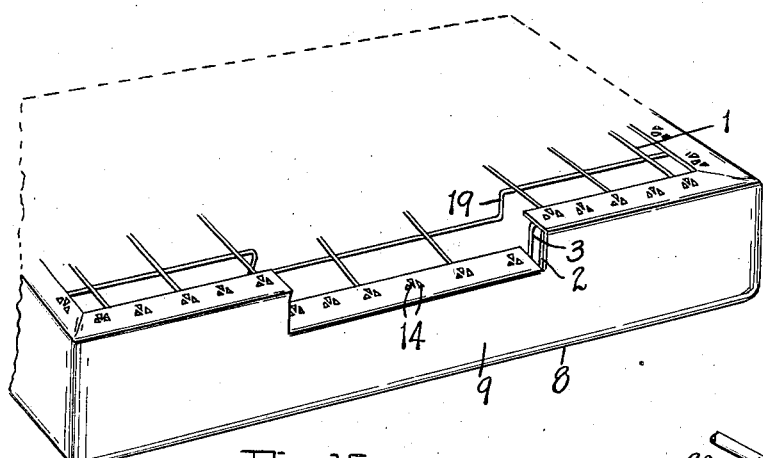
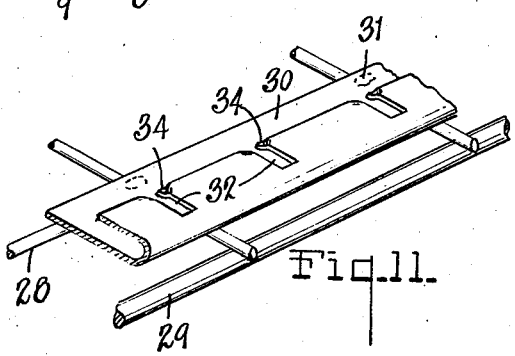
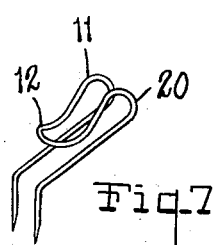
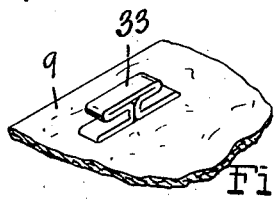
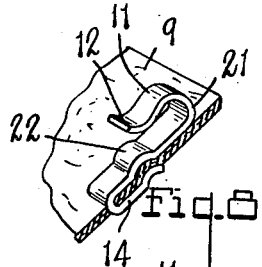
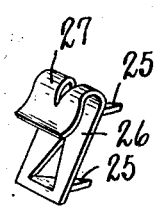
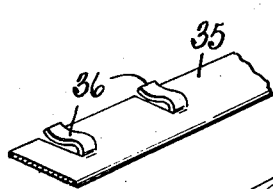
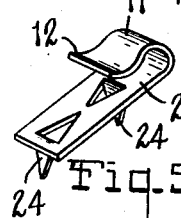
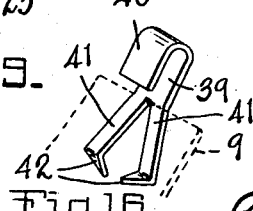
INVENTOR.
John M. Oldham
BY
Chappell, Earl T Chappell
ATTORNEYS Patented Oct. 26, 1937

2,096,822

UNITED STATES PATENT OFFICE 2,096,822

SPRING STRUCTURE

John M. Oldham, Detroit, Mich., assignor to L. A. Young Spring and Wire Corporation, Detroit, Mich.

Application January 25, 1936, Serial No. 60,769

7 Claims. (Cl. 155—180)

This structure relates to improvements in spring structures, particularly spring cushioned vehicle body upholsetery and the like.

The main objects of the invention are:

First, to provide an improved spring cushion structure in which the upholstery may be quickly applied by an unskilled workman and quickly removed for replacement or repair of the spring unit should occasion require.

Second, to provide a spring structure embodying these advantages in which the upholstery is uniformly and effectively secured, and may be effectively secured to spring cushion structures having irregular bases or base conformations such as is necessary to meet the conditions in modern types of automobiles—for example, elevations to accommodate propeller shafts, rear axles, wheel housings, and the like.

Third, to provide a spring cushion structure embodying these advantages, which is economical in its parts and at the same time strong and durable when assembled.

Objects relating to details and economies of my invention will appear from the description to follow. The invention is defined and pointed out in the claims.

Preferred embodiments of my invention are illustrated in the accompanying drawings, in which:

Fig. 1 is an inverted view of a spring seat cushion embodying my invention, a portion of the upholstery being sectioned and broken away.

Fig. 2 is an enlarged detail vertical section.

Fig. 3 is a plan view of the base structure illustrated in Figs. 1 and 2.

Fig. 4 is a perspective view of one of the hooked upholstery attaching clips shown in the embodiment of Figs. 1 and 2.

Fig. 5 is a fragmentary section illustrating a modification and adaptation of my improvements to a cushion having a dropped front border member.

Fig. 6 is a perspective view of the fastener clip shown in Fig. 5.

Fig. 7 is a perspective view of a hooked fastener clip formed of wire.

Fig. 8 is a perspective view of another embodiment of fastener hook or clip in which the parts are conformed to provide a retaining hump in opposition to the bill of the hook.

Fig. 9 is a perspective view of another form of fastener in which the attaching prongs are struck out of the body of the fastener.

Fig. 10 is a perspective view of still another embodiment of fastener similar to Fig. 9 but requiring less stock.

Fig. 11 is a fragmentary inverted perspective view of a modified form of base.

Fig. 12 is a fragmentary perspective view of a fastener stud designed to coact with the base of Fig. 11.

Fig. 13 is a fragmentary perspective view of a modified form of base attaching member.

Fig. 14 is a fragmentary perspective view of a multiple attaching clip adapted for coaction with the attaching member of Fig. 13.

Fig. 15 is a fragmentary perspective view of a cushion structure illustrating the adaptation of my improvements to structures having irregular bases or bases with offsets therein.

Fig. 16 is a perspective view of a further embodiment of fastener.

In the embodiment of my invention illustrated, Figs. 1 to 4, the base comprises a spring supporting grid 1 formed of crossed wires welded together at the crossing points and a border frame to which the grid is secured preferably by welding, the border frame consisting of an outer member 2 of wire and an inner member 3 also of wire disposed concentrically thereof, these members being secured together by the ends of the intersecting grid elements 4 as by spot welding. I thus provide a very light and at the same time rigid base and one which occupies a minimum of space, which is of advantage as it will be understood that in modern automobiles it is desirable to have the cushions occupy a minimum of space and at the same time the springs must be of suitable length.

The springs 5 are, in this embodiment, assembled in pockets 6, the springs being secured to the base frame by suitable means as indicated at 7. In practice, the base and springs are commonly assembled as a unit and delivered as such to the upholsterer or the automobile body manufacturer.

The upholstery 8 is provided with a skirt 9 embracing the spring unit, the skirt being drawn around the outer frame member 2 and detachably secured to the inner frame member 3 by means of the hook-like clips 10 attached in suitably spaced relation to the skirt adjacent the edge thereof. These clips or fasteners 10, in the embodiment shown in Fig. 4, are formed of sheet metal stampings having hook portions 11, the bill 12 of which is turned upwardly to facilitate engagement, the body portion 13 having attaching prongs 14 integral therewith, inserted through and clenched in the upholstery skirt as is clearly indicated.

A highly satisfactory way of assembling the upholstery with the spring unit is to place the upholstery in an inverted position upon a bed or table with the skirt turned outwardly, invert the spring unit therein, compress the spring unit by means of a suitable ram or press well known to upholsterers, turn the skirt inwardly around the base member, and secure the skirt to the base member by engaging the fasteners 10. This can be very quickly done and by an unskilled workman or a woman as very little effort is required to engage the fasteners.

The fasteners may be applied by machinery when the upholstery is formed, so that the parts are very economical and, as stated, can be very quickly assembled. Should occasion require, such as might result from an injury to the upholstery or its becoming soiled, or replacement be desirable for any purpose, or in the event that it is desired to repair the spring unit as may be desirable from displacement of springs, the upholstery can be readily removed and easily replaced by an unskilled workman without returning the springs to the factory. When the press is released, the springs draw the skirt taut and hold the parts effectively in engagement. However, the fasteners are formed so that they have a snap engagement with the member 3.

In the modification shown in Fig. 5, the outer border member 15 corresponding to the member 2 is dropped or spaced below the inner member 16 corresponding to the member 3 in the embodiment of Fig. 2, the skirt being drawn around the outer border member and secured to the inner member in the same manner. The clips 17 are, however, of slightly modified form, the body 18 of the clips having only one attaching prong. This is found sufficient in certain embodiments, as, for example, the embodiment shown in Fig. 5, because there is a very definite snubbing action around the outer border frame and the strain on the fasteners is correspondingly lessened.

In Fig. 15, the base member is provided with an upwardly offset portion 19, and it will be noted that the method of assembling readily adapts itself to such a situation.

In Fig. 7, the clip of the attaching member 20 is formed of wire.

In the embodiment shown in Fig. 8, the fastener 21 is provided with a hump or offset 22 in the body thereof opposite the bill of the hook, thus providing a somewhat more complete snap action than in the embodiments shown in the other figures.

In the embodiment shown in Fig. 9, the body 23 of the fastener has attaching prongs 24 struck out therefrom.

In the embodiment shown in Fig. 10, the attaching prongs 25 are struck out partially from the body 26 of the fastener and partially from the hook portion 27 thereof.

In Fig. 11, I provide the base, designated generally by the numeral 28, with a border member 29, and to the under side of the base I attach an attaching member 30 formed of sheet metal of U cross section, secured flatwise to the under side of the base as by spot welding indicated at 31. The free arm of attaching member 30 has inwardly facing slots 32 therein adapted to receive headed studs 33 (Fig. 12) on the skirt 9. These studs are slipped individually into the slots, the edges of the slots having detents 34 struck therefrom retaining the studs. However, when the parts are assembled, it will be appreciated that the tension of the springs holds the studs in the slots.

In Fig. 13, I illustrate an attaching member 35 having spaced tongues 36 struck therefrom adapted to be engaged by the loops 37 of a continuous wire fastener formed by zigzag bends in a wire, this fastener being attached to the skirt by means of staple-like fasteners 38 (Fig. 14). The loops of this fastener have a snap engagement with the tongues 36.

In the embodiment illustrated in Fig. 16, the body portion 39 of the fastener carries an offset hook 40 for engaging the spring supporting base, as well as a pair of integral deformable arms 41 angularly disposed with respect to one another. Each of the arms carries an inwardly facing deformable prong 42. As illustrated in Fig. 16, the clip is placed with the arms on either side of the upholstery skirt 9, after which the arms and prongs are compressed to grip the skirt. It will be seen that the embodiment of Fig. 16 enables considerable economy of material used in making the clip since the transverse dimension of the same is relatively small.

In all of these embodiments, the assembling operations are the same; that is, the spring unit is inverted within the upholstery and compressed so that the fasteners may be readily engaged. This fastening means, as stated, permits the ready assembling of the upholstery with the spring unit and at the same time permits removal of the upholstery for replacement or cleaning or repair of the spring by an unskilled person and without factory equipment as the spring unit may be easily compressed manually or by improvised means.

I have illustrated and described my improvements in embodiments thereof which I regard as highly satisfactory. I have not attempted to illustrate or describe certain other modifications or adaptations I contemplate as it is believed that this disclosure will enable those skilled in the art to embody or adapt my improvements as may be desired.

Having thus described my invention, what I claim as new and desire to secure by Letters Patent, is:

1. In a spring cushion structure, the combination with a spring supporting base comprising a border frame consisting of connected concentrically disposed outer and inner members of wire and intersecting wire grid elements welded to and securing said members, body springs mounted on said base, upholstery on said body springs provided with a skirt embracing and drawn around the outer member of the border frame, and a plurality of spring clips secured to said skirt and having snap engagement with the inner member of the border frame.

2. In a spring cushion structure, the combination with a spring supporting base comprising a border frame consisting of connected concentrically disposed outer and inner members, grid means rigidly securing said members in spaced relation, body springs mounted on said base, upholstery on said body springs provided with a skirt embracing and drawn around the outer member of the border frame, and a plurality of clips secured to said skirt and having engagement with the inner member of the border frame.

3. In a spring cushion structure, the combination with body springs, of a supporting base therefor comprising outer and inner members and intersecting wire grid elements welded to said members and to each other, upholstery on said springs provided with a skirt embracing and drawn around the outer member, and a plurality of fastener members on said skirt engaged with the inner member.

4. In a spring structure, the combination with body springs, of a base therefor, and upholstery on said springs provided with a skirt embracing and lapped upon the under side of said base, said base comprising a wire outer frame member and intersecting grid wires welded thereto, and being provided with an upholstery attaching and reinforcing member welded thereto and spaced from the outer member, said skirt and attaching member having spring snap engagement at a plurality of points.

5. In a spring structure, the combination with body springs, of a supporting base therefor, an upholstery attaching member on the under side of the base provided with an inwardly projecting downwardly offset flange having spaced slots opening at the inner edge thereof, the edges of the slots being upset to provide detents, upholstery on said springs provided with a skirt embracing said base, and headed studs on said skirt engageable in the slots of said attaching member.

6. In a spring structure, the combination with body springs, of a supporting base therefor, an upholstery attaching member on the under side of the base provided with an inwardly projecting downwardly offset flange having spaced slots opening at the inner edge thereof, upholstery on said springs provided with a skirt embracing said base, and headed studs on said skirt engageable in the slots of said attaching member.

7. In a spring structure, the combination with body springs, of a supporting base therefor, an upholstery attaching member on the under side of the base provided with inwardly opening spaced slots, upholstery on said springs provided with a skirt embracing said base, and headed studs on said skirt engageable in the slots of said attaching member.

JOHN M. OLDHAM.